United States Patent
Ito et al.

(10) Patent No.: US 10,337,928 B2
(45) Date of Patent: Jul. 2, 2019

(54) AUTOCORRELATION MEASUREMENT DEVICE

(71) Applicant: HAMAMATSU PHOTONICS K.K., Hamamatsu-shi, Shizuoka (JP)

(72) Inventors: Haruyasu Ito, Hamamatsu (JP); Yasunori Igasaki, Hamamatsu (JP); Junji Okuma, Hamamatsu (JP)

(73) Assignee: HAMAMATSU PHOTONICS K.K., Hamamatsu-shi, Shizuoka (JP)

( * ) Notice: Subject to any disclaimer, the term of this patent is extended or adjusted under 35 U.S.C. 154(b) by 0 days.

(21) Appl. No.: 15/754,377

(22) PCT Filed: Aug. 24, 2016

(86) PCT No.: PCT/JP2016/074672
§ 371 (c)(1),
(2) Date: Feb. 22, 2018

(87) PCT Pub. No.: WO2017/033974
PCT Pub. Date: Mar. 2, 2017

(65) Prior Publication Data
US 2018/0245984 A1    Aug. 30, 2018

(30) Foreign Application Priority Data

Aug. 26, 2015  (JP) ................. 2015-166465

(51) Int. Cl.
G02F 1/37      (2006.01)
G01J 11/00     (2006.01)

(52) U.S. Cl.
CPC ............... G01J 11/00 (2013.01); G02F 1/37 (2013.01); *G02F 2202/20* (2013.01)

(58) Field of Classification Search
CPC .................................................... G01J 11/00
See application file for complete search history.

(56) References Cited

U.S. PATENT DOCUMENTS 3,520,616 A * 7/1970 Brienza .................... G01J 11/00
                                                    356/225
4,480,192 A * 10/1984 Albrecht ............... G04F 13/026
                                                    250/550

(Continued)

FOREIGN PATENT DOCUMENTS

| CN | 101900608 A | 12/2010 |
| CN | 102636272 A | 8/2012 |

(Continued)

OTHER PUBLICATIONS

English-language translation of International Preliminary Report on Patentability (IPRP) dated Mar. 8, 2018 that issued in WO Patent Application No. PCT/JP2016/074672.

(Continued)

*Primary Examiner* — Tri T Ton
*Assistant Examiner* — Rufus L Phillips
(74) *Attorney, Agent, or Firm* — Drinker Biddle & Reath LLP

(57) ABSTRACT

An autocorrelation measurement device includes a first reflection member, a second reflection member, a focusing unit, a nonlinear optical crystal, a detection unit, a filter, an aperture, a delay adjusting unit, and an analysis unit. Incident pulsed light is transmitted through the second reflection member and incident on the first reflection member. First pulsed light reflected on a first reflection surface of the first reflection member and a second reflection surface of the second reflection member and second pulsed light reflected on a second reflection surface of the first reflection member and a first reflection surface of the second reflection member are incident on the nonlinear optical crystal via the focusing unit. Second harmonic light generated in the nonlinear optical crystal is detected by the detection unit.

7 Claims, 8 Drawing Sheets

(56) References Cited

U.S. PATENT DOCUMENTS

| | | | |
|---|---|---|---|
| 5,033,853 A * | 7/1991 | Frangineas, Jr. | G01J 11/00 356/450 |
| 2006/0119855 A1* | 6/2006 | Li | G01J 11/00 356/450 |
| 2012/0044490 A1 | 2/2012 | Bowlan et al. | |
| 2014/0009757 A1* | 1/2014 | Bodkin | G01J 4/04 356/300 |
| 2014/0362376 A1* | 12/2014 | Liu | G01J 11/00 356/328 |

FOREIGN PATENT DOCUMENTS

| | | |
|---|---|---|
| CN | 103698025 A | 4/2014 |
| JP | H7-270246 | 10/1995 |
| JP | H11-326065 | 11/1999 |
| JP | 2001-074560 | 3/2001 |
| JP | 2003-106903 | 4/2003 |
| JP | 3736410 | 1/2006 |
| JP | 2009-008419 | 1/2009 |

OTHER PUBLICATIONS

Naganuma, Kazunori, "Measurements of Ultrashort Light Pulses," Kogaku, 2001, vol. 30, No. 12, pp. 834-844 with partial English language translation attached.

* cited by examiner

AUTOCORRELATION MEASUREMENT DEVICE

TECHNICAL FIELD

The present invention relates to an autocorrelation measurement device that measures a pulse width of pulsed light on the basis of autocorrelation of the pulsed light.

BACKGROUND ART

In a case where a pulse width of pulsed light is short (for example, in a case of 10 picoseconds or less), an SHG (second harmonic generation) autocorrelation measurement device using a nonlinear optical crystal being capable of generating second harmonic light by incidence of the pulsed light is used for measurement of the pulse width. Such autocorrelation measurement devices are described in Patent Documents 1 and 2 and Non Patent Document 1.

A conventional autocorrelation measurement device includes a Michelson interferometer having a beam splitter, a fixed reflection unit and a movable reflection unit. Incident pulsed light is branched into two components by the beam splitter to become first pulsed light and second pulsed light. The first pulsed light is reflected by the fixed reflection unit and is returned to the beam splitter, and the second pulsed light is reflected by the movable reflection unit and is returned to the beam splitter. The first pulsed light and the second pulsed light returned to the beam splitter are incident on the nonlinear optical crystal via the beam splitter.

Second harmonic light is generated in the nonlinear optical crystal on which the first pulsed light and the second pulsed light are incident, and the second harmonic light is detected by a detection unit. The movable reflection unit is movable, and its movement changes a delay time between the first pulsed light and the second pulsed light which are incident on the nonlinear optical crystal. Further, a detection result by the detection unit is changed due to the change in the delay time. Therefore, the pulse width of the incident pulsed light can be analyzed on the basis of the relationship between the delay time and the detection result by the detection unit.

CITATION LIST

Patent Literature

Patent Document 1: Japanese Patent Application Laid-Open Publication No. H7-270246
Patent Document 2: Japanese Patent Publication No. 3736410

Non Patent Literature

Non Patent Document 1: Kazunori Naganuma, "Measurements of Ultrashort Light Pulses", Optics, Vol. 30, No. 12, pp. 834-844 (2001)

SUMMARY OF INVENTION

Technical Problem

A conventional autocorrelation measurement device includes a Michelson interferometer having a beam splitter and the like, and first pulsed light and second pulsed light are emitted from the beam splitter into different directions. For this reason, the configuration of the conventional autocorrelation measurement device is complicated and large.

The present invention has been made to solve the above problem, and an object thereof is to provide an autocorrelation measurement device that can be downsized.

Solution to Problem

An autocorrelation measurement device according to the present invention includes (1) a first reflection member having a first reflection surface for reflecting a part of incident pulsed light and a second reflection surface for reflecting light transmitted through the first reflection surface in the incident pulsed light, (2) a second reflection member having a first reflection surface for reflecting a part of light emitted from the first reflection member and a second reflection surface for reflecting light transmitted through the first reflection surface in the light, (3) a focusing unit for focusing first pulsed light reflected on the first reflection surface of the first reflection member and the second reflection surface of the second reflection member and second pulsed light reflected on the second reflection surface of the first reflection member and the first reflection surface of the second reflection member, (4) a nonlinear optical crystal disposed on a focusing position by the focusing unit and for generating second harmonic light by incidence of the first pulsed light and the second pulsed light, (5) a detection unit for detecting the second harmonic light, (6) a delay adjusting unit for changing a delay time between the first pulsed light and the second pulsed light incident on the nonlinear optical crystal, and (7) an analysis unit for obtaining a pulse width of the incident pulsed light on the basis of a relationship between the delay time set by the delay adjusting unit and a detection result by the detection unit.

Advantageous Effects of Invention

According to the present invention, an autocorrelation measurement device that can be downsized can be provided.

DESCRIPTION OF EMBODIMENTS

Hereinafter, embodiments for carrying out the present invention will be described in detail with reference to the accompanying drawings. In the description of the drawings, the same elements will be denoted by the same reference signs, without redundant description. The present invention is not limited to these examples.

(First Embodiment)

Figure 1:
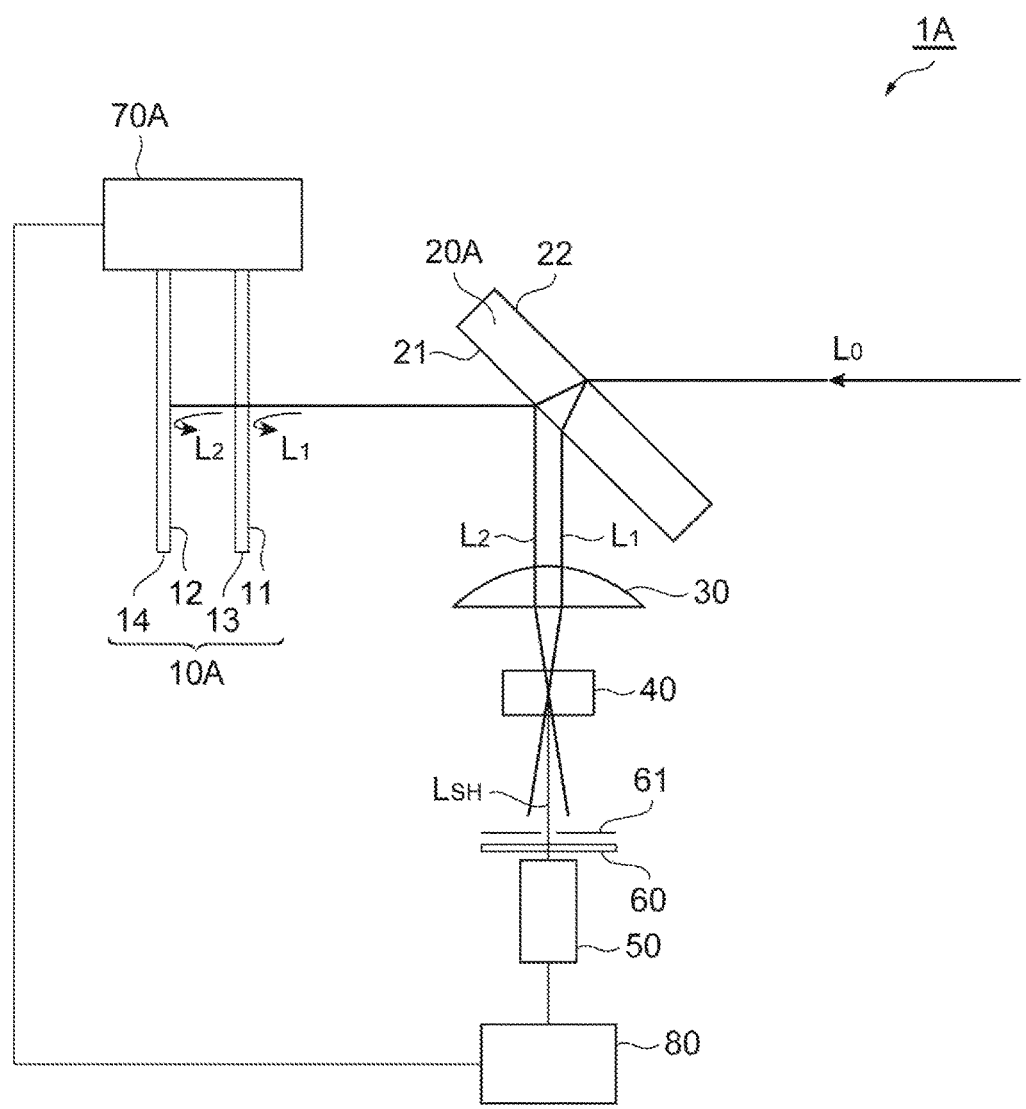
FIG. 1 is a diagram illustrating a configuration of an autocorrelation measurement device 1A according to a first embodiment.

FIG. 1 is a diagram illustrating a configuration of an autocorrelation measurement device 1A according to the first embodiment. The autocorrelation measurement device 1A includes a first reflection member 10A, a second reflection member 20A, a focusing unit 30, a nonlinear optical crystal 40, a detection unit 50, a filter 60, an aperture 61, a delay adjusting unit 70A, and an analysis unit 80.

The first reflection member 10A includes a first flat plate 13 having a first reflection surface 11 that reflects a part of incident pulsed light $L_0$ and a second flat plate 14 having a second reflection surface 12 that reflects light transmitted through the first reflection surface 11 in the incident pulsed light $L_0$. The first reflection surface 11 of the first flat plate 13 and the second reflection surface 12 of the second flat plate 14 face each other and are parallel to each other. An optical path length between the first reflection surface 11 and the second reflection surface 12 (that is, a distance between the first flat plate 13 and the second flat plate 14) is variable and is set by the delay adjusting unit 70A. The first flat plate 13 and the second flat plate 14 are made of a material transparent for the incident pulsed light $L_0$ (for example, synthetic quartz or BK7).

The second reflection member 20A is a flat plate having a first reflection surface 21 that reflects a part of light emitted from the first reflection member 10A and a second reflection surface 22 that reflects light transmitted through the first reflection surface 21 in the light. The first reflection surface 21 and the second reflection surface 22 of the second reflection member 20A are parallel to each other, and are not parallel to the first reflection surface 11 and the second reflection surface 12 of the first reflection member 10A. The second reflection member 20A is made of a material transparent for the incident pulsed light $L_0$ (for example, quartz glass or BK7).

The incident pulsed light $L_0$ is transmitted through the second reflection member 20A and is incident on the first reflection member 10A. At this time, light reflected on the first reflection surface 11 of the first reflection member 10A and the second reflection surface 22 of the second reflection member 20A is regarded as first pulsed light $L_1$ and light reflected on the second reflection surface 12 of the first reflection member 10A and the first reflection surface 21 of the second reflection member 20A is regarded as second pulsed light $L_2$. Respective beams of the first pulsed light $L_1$ and the second pulsed light $L_2$ do not overlap each other in the focusing unit 30. The focusing unit 30 focuses the first pulsed light $L_1$ and the second pulsed light $L_2$. A focusing optical system constituting the focusing unit 30 may be a lens or a concave mirror.

The nonlinear optical crystal 40 is disposed on a focusing position by the focusing unit 30, and generates second harmonic light $L_{SH}$ by incidence of the first pulsed light $L_1$ and the second pulsed light $L_2$. The first pulsed light $L_1$ and the second pulsed light $L_2$ incident on the nonlinear optical crystal 40 are non-coaxial with each other. For example, BBO (β-BaB$_2$O$_4$), LBO (LiB$_3$O$_5$), KTO (KTaO$_3$), KDP (KH$_2$PO$_4$) or the like is used as the nonlinear optical crystal 40. Further, the incidence of the first pulsed light $L_1$ and the second pulsed light $L_2$ on the nonlinear optical crystal 40 is set to satisfy a type-I phase matching condition.

The filter 60 and the aperture 61 are provided between the nonlinear optical crystal 40 and the detection unit 50. The filter 60 blocks a wavelength component (fundamental wave component) of the incident pulsed light $L_0$ and transmits the second harmonic light $L_{SH}$. The aperture 61 selectively passes the second harmonic light $L_{SH}$ due to a correlation between the first pulsed light $L_1$ and the second pulsed light $L_2$, in the light emitted from the nonlinear optical crystal 40, to the detection unit 50. The detection unit 50 detects an intensity of the second harmonic light $L_{SH}$ due to the correlation between the first pulsed light $L_1$ and the second pulsed light $L_2$. For example, a photomultiplier tube, a photodiode or the like is used as a photodetector constituting the detection unit 50.

The delay adjusting unit 70A changes the distance between the first flat plate 13 and the second flat plate 14 to change the optical path length between the first reflection surface 11 and the second reflection surface 12 of the first reflection member 10A, thereby to change a delay time τ between the first pulsed light $L_1$ and the second pulsed light $L_2$ incident on the nonlinear optical crystal 40. The delay adjusting unit 70A may move both the first flat plate 13 and the second flat plate 14 or may move either one of the first flat plate 13 and the second flat plate 14. For example, a moving stage, a piezo element, a speaker or the like is used as the delay adjusting unit 70A. According to the delay adjusting unit 70A, the delay time τ can be continuously changed.

The analysis unit 80 changes the delay time τ by the delay adjusting unit 70A and acquires a detection result (intensity $I_{SH}(τ)$ of the second harmonic light $L_{SH}$) by the detection unit 50 of when each delay time τ is set. Then, the analysis unit 80 obtains an SHG autocorrelation function $G_2(τ)$ expressed by the following formula (1) on the basis of a relationship between the delay time τ and the second harmonic light intensity $I_{SH}(τ)$, to obtain a pulse width of the incident pulsed light $L_0$. I(t) represents a value proportional to the square of an absolute value of electric field amplitude E(t) of the incident pulsed light $L_0$, that is, the intensity of the incident pulsed light $L_0$, as shown in the following formula (2), and is normalized as shown in the following formula (3). t is a time variable.

[Formula 1]

$$I_{SH}(τ) \propto \int_{-\infty}^{\infty} I(t)I(t-τ)dt \equiv G_2(τ) \quad (1)$$

[Formula 2]

$$I(t) \propto |E(t)|^2 \quad (2)$$

[Formula 3]

$$\int_{-\infty}^{\infty} I^2(t)dt = 1 \quad (3)$$

Figure 2:
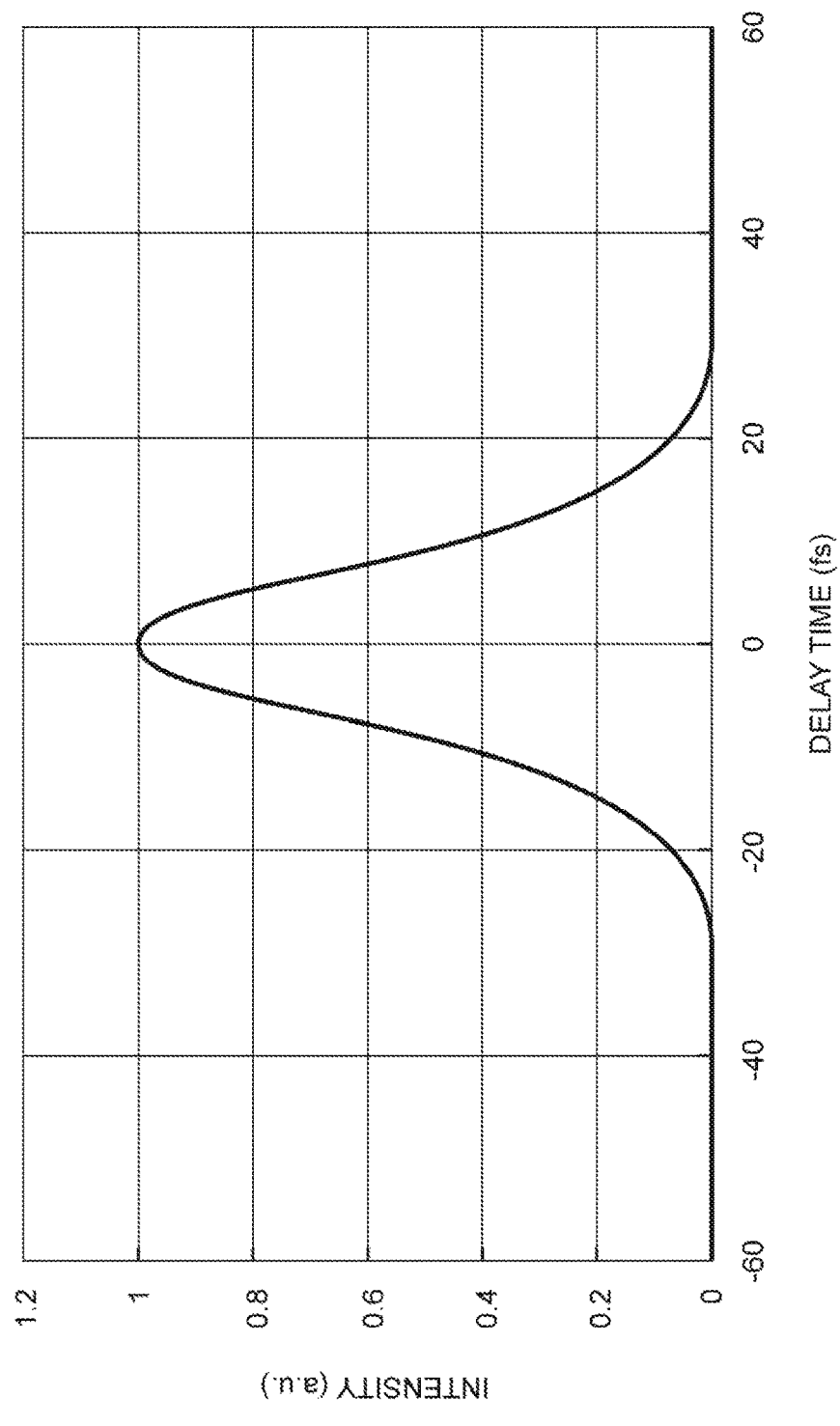
FIG. 2 is a diagram illustrating an example of an SHG autocorrelation waveform obtained by a detection unit 50 of the autocorrelation measurement device 1A of the first embodiment.

FIG. 2 is a diagram illustrating an example of an SHG autocorrelation waveform obtained by the detection unit 50 of the autocorrelation measurement device 1A of the first embodiment. The horizontal axis represents the delay time (time delay) τ set by the delay adjusting unit 70A, and corresponds to the optical path length between the first reflection surface 11 and the second reflection surface 12 of the first reflection member 10A.

As illustrated in this figure, when the delay time τ is 0, a temporal overlap between the first pulsed light $L_1$ and the second pulsed light $L_2$ incident on the nonlinear optical crystal 40 becomes maximum, and thus the intensity of the SHG autocorrelation signal becomes maximum. The temporal overlap between the first pulsed light $L_1$ and the second pulsed light $L_2$ incident on the nonlinear optical crystal 40 becomes smaller as the absolute value of the delay time τ becomes larger, and thus the intensity of the SHG autocorrelation signal becomes smaller. There is a specific relationship depending on the pulse waveform of the incident pulsed light $L_0$ between a full width at half maximum of the SHG autocorrelation waveform and the pulse width (full width at half maximum) of the incident pulsed light $L_0$. Therefore, the pulse width of the incident pulsed light $L_0$ can be obtained on the basis of the form of the SHG autocorrelation function. Note that such a technique is called non-collinear SHG autocorrelation method.

The autocorrelation measurement device 1A of the present embodiment emits the first pulsed light $L_1$ and the second pulsed light $L_2$ after the incident pulsed light $L_0$ is branched into two components to the same direction rather than emitting both the pulsed light components to different directions, and therefore, downsizing is easy.

It is preferable to apply a dielectric multilayer film to any one of the surfaces of both the first reflection member 10A and the second reflection member 20A, the surfaces transmitting or reflecting light, so that the intensity of each of the first pulsed light $L_1$ and the second pulsed light $L_2$ is adjusted, and further, the intensity ratio between both the pulsed light components is adjusted. In doing so, the intensity of the second harmonic light $L_{SH}$ detected by the detection unit 50 can be made large.

For example, the dielectric multilayer film is not formed on any surface of the first flat plate 13 and the second flat plate 14 of the first reflection member 10A and the second reflection member 20A, and the reflectance on each surface is 4%. Further, the intensity of the incident pulsed light $L_0$ is set to 100 mW. At this time, the intensity of the first pulsed light $L_1$ is 0.136 mW and the intensity of the second pulsed light $L_2$ is 0.125 mW.

In contrast, the dielectric multilayer film is appropriately applied to set the reflectance of the first reflection surface 11 of the first flat plate 13 to 40%, and the reflectance of the other surface of the first flat plate 13 (the surface opposite to the second reflection member 20A) to 0%, the reflectance of the second reflection surface 12 of the second flat plate 14 to 100%, and the reflectance of the first reflection surface 21 of the second reflection member 20A to 50%. The dielectric multilayer film is not applied to the second reflection surface 22 of the second reflection member 20A, and the reflectance of the second reflection surface 22 is set to 4%. At this time, the intensity of the first pulsed light $L_1$ is 8.8 mW and the intensity of the second pulsed light $L_2$ is 8.6 mW.

Since the intensity of the second harmonic light $L_{SH}$ is proportional to the product of the intensity of the first pulsed light $L_1$ and the intensity of the second pulsed light $L_2$, the intensity becomes about 4450 ($=(8.8\times 8.6)/(0.136\times 0.125)$) times by appropriate application of the dielectric multilayer film as described above.

(Second Embodiment)

Figure 3:
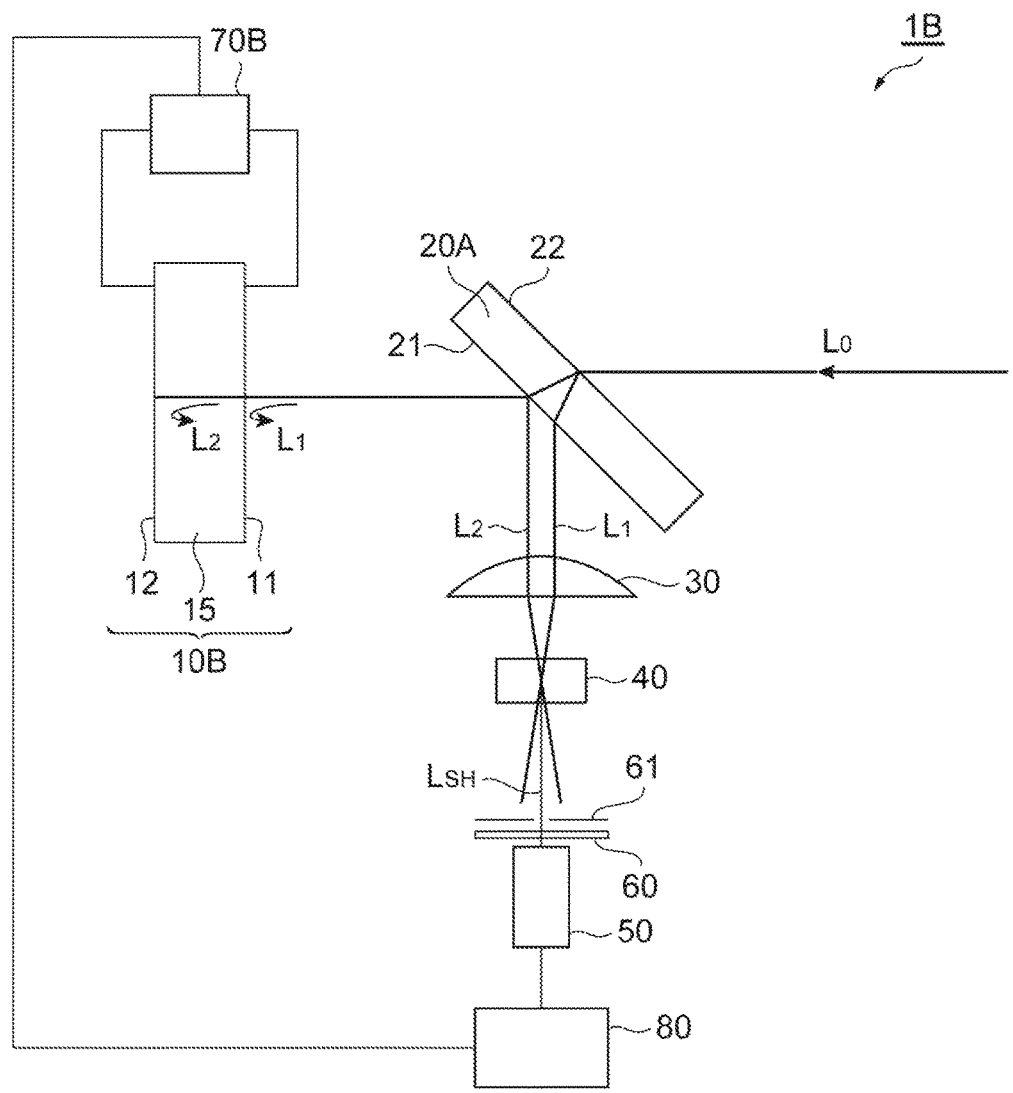
FIG. 3 is a diagram illustrating a configuration of an autocorrelation measurement device 1B according to a second embodiment.

FIG. 3 is a diagram illustrating a configuration of an autocorrelation measurement device 1B according to the second embodiment. The autocorrelation measurement device 1B includes a first reflection member 10B, a second reflection member 20A, a focusing unit 30, a nonlinear optical crystal 40, a detection unit 50, a filter 60, an aperture 61, a delay adjusting unit 70B, and an analysis unit 80.

The autocorrelation measurement device 1B of the second embodiment illustrated in FIG. 3 is different from the configuration of the autocorrelation measurement device 1A of the first embodiment illustrated in FIG. 1 in including the first reflection member 10B in place of the first reflection member 10A and in including the delay adjusting unit 70B in place of the delay adjusting unit 70A.

The first reflection member 10B includes a refractive index variable member 15 provided between a first reflection surface 11 and a second reflection surface 12. The refractive index of the refractive index variable member 15 is changed according to the applied voltage value. A liquid crystal or a nonlinear optical crystal (for example, LN ($LiNbO_3$), KTN ($KTa_{1-x}Nb_xO_3$)) or the like can be used as the refractive index variable member 15, and in this case, the two principal surfaces facing each other can be the first reflection surface 11 and the second reflection surface 12. Further, a phase modulation type spatial light modulator can also be used as the refractive index variable member 15, and in this case, a CMOS chip portion and a glass substrate end face of the spatial light modulator can be the first reflection surface 11 and the second reflection surface 12.

The delay adjusting unit 70B changes a voltage value applied to the refractive index variable member 15 to change an optical path length between the first reflection surface 11 and the second reflection surface 12 of the first reflection member 10B, thereby to change a delay time τ between first pulsed light $L_1$ and second pulsed light $L_2$ incident on the nonlinear optical crystal 40. The delay adjusting unit 70B can change the delay time τ continuously and at a high speed.

The autocorrelation measurement device 1B of the present embodiment emits the first pulsed light $L_1$ and the second pulsed light $L_2$ after the incident pulsed light $L_0$ is branched into two components to the same direction rather than emitting both the pulsed light components to different directions, and therefore, downsizing is easy.

Further, also in the present embodiment, it is preferable to apply a dielectric multilayer film to any one of the surfaces of both the first reflection member 10B and the second reflection member 20A, the surfaces transmitting or reflecting light, so that the intensity of each of the first pulsed light $L_1$ and the second pulsed light $L_2$ is adjusted, and further, the intensity ratio between both the pulsed light components is adjusted. In doing so, the intensity of the second harmonic light $L_{SH}$ detected by the detection unit 50 can be made large.

(Third Embodiment)

Figure 4:
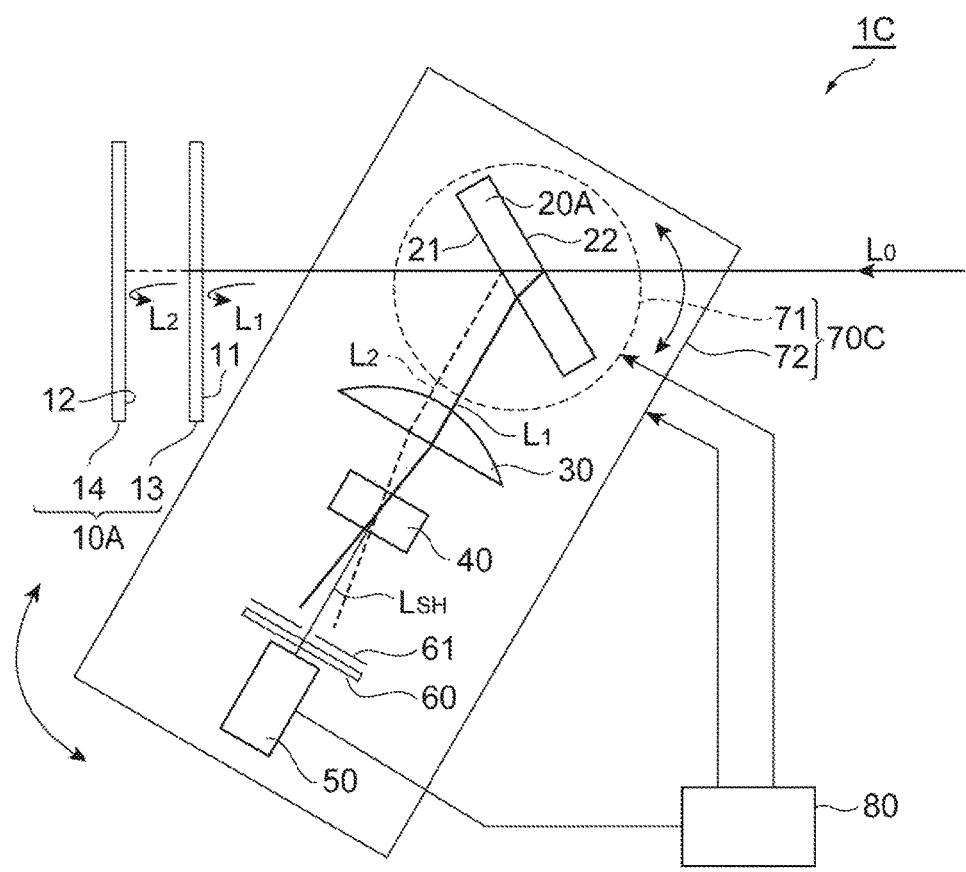
FIG. 4 is a diagram illustrating a configuration of an autocorrelation measurement device 1C according to a third embodiment.

FIG. 4 is a diagram illustrating a configuration of an autocorrelation measurement device 1C according to the third embodiment. The autocorrelation measurement device 1C includes a first reflection member 10A, a second reflection member 20A, a focusing unit 30, a nonlinear optical crystal 40, a detection unit 50, a filter 60, an aperture 61, a delay adjusting unit 70C, and an analysis unit 80.

The autocorrelation measurement device 1C of the third embodiment illustrated in FIG. 4 is different from the configuration of the autocorrelation measurement device 1A of the first embodiment illustrated in FIG. 1 in including the delay adjusting unit 70C in place of the delay adjusting unit 70A.

The delay adjusting unit 70C includes a first rotation stage 71 and a second rotation stage 72. The first rotation stage 71 rotates the second reflection member 20A. The second rotation stage 72 integrally rotates the second reflection member 20A, the focusing unit 30, the nonlinear optical crystal 40, the detection unit 50, the filter 60, and the aperture 61. Each of rotation centers of the first rotation stage 71 and the second rotation stage 72 is a center position of respective emitting positions of first pulsed light $L_1$ and second pulsed light $L_2$ on a first reflection surface 21 of the second reflection member 20A.

When the second reflection member 20A is rotated by an angle θ by the rotation of the first rotation stage 71 and the second rotation stage 72, the focusing unit 30, the nonlinear optical crystal 40, the detection unit 50, the filter 60, and the aperture 61 are integrally rotated by an angle 2θ. The delay adjusting unit 70C including the first rotation stage 71 and the second rotation stage 72 changes the angle θ of the rotation to change an optical path length of the first pulsed light $L_1$ between the first reflection surface 21 and the second reflection surface 22 of the second reflection member 20A, thereby to change a delay time τ between the first pulsed light $L_1$ and the second pulsed light $L_2$ incident on the nonlinear optical crystal 40.

The autocorrelation measurement device 1C of the present embodiment emits the first pulsed light $L_1$ and the second pulsed light $L_2$ after the incident pulsed light $L_0$ is branched into two components to the same direction rather than emitting both the pulsed light components to different directions, and therefore, downsizing is easy.

(Fourth Embodiment)

Figure 5:
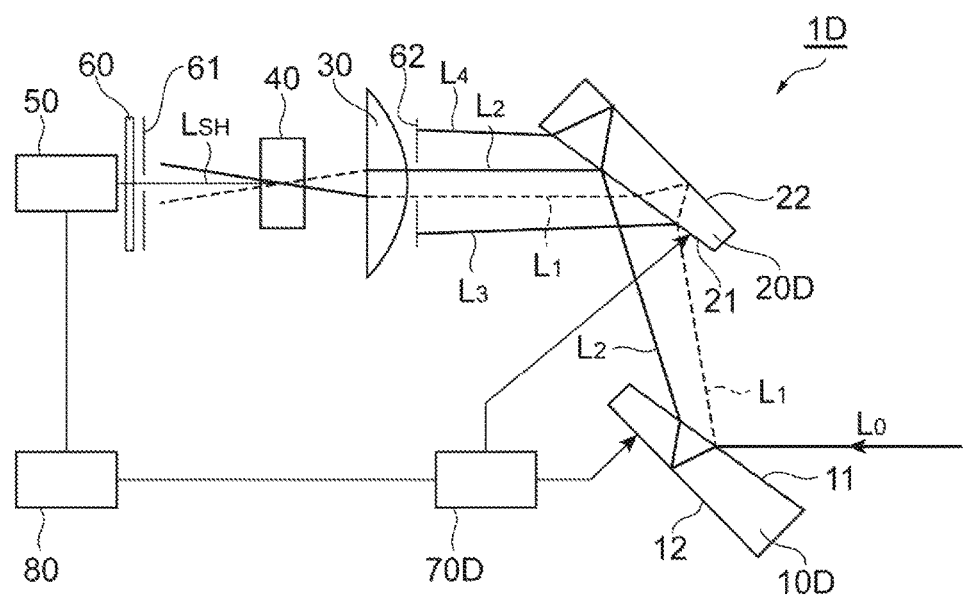
FIG. 5 is a diagram illustrating a configuration of an autocorrelation measurement device 1D according to a fourth embodiment.

FIG. 5 is a diagram illustrating a configuration of an autocorrelation measurement device 1D according to the fourth embodiment. The autocorrelation measurement device 1D includes a first reflection member 10D, a second reflection member 20D, a focusing unit 30, a nonlinear optical crystal 40, a detection unit 50, a filter 60, apertures 61 and 62, a delay adjusting unit 70D, and an analysis unit 80.

The autocorrelation measurement device 1D of the fourth embodiment illustrated in FIG. 5 is different from the configuration of the autocorrelation measurement device 1A of the first embodiment illustrated in FIG. 1 in including the first reflection member 10D in place of the first reflection member 10A and in including the second reflection member 20D in place of the second reflection member 20A. Further, the autocorrelation measurement device 1D of the fourth embodiment is different in further including the aperture 62 and in including the delay adjusting unit 70D in place of the delay adjusting unit 70A.

The first reflection member 10D is a flat plate having two principal surfaces facing each other as a first reflection surface 11 and a second reflection surface 12, and the first reflection surface 11 and the second reflection surface 12 are non-parallel to each other. The second reflection member 20D is a flat plate having two principal surfaces facing each other as a first reflection surface 21 and a second reflection surface 22, and the first reflection surface 21 and the second reflection surface 22 are non-parallel to each other.

The delay adjusting unit 70D moves the first reflection member 10D in a direction parallel to the first reflection surface 11, thereby to change an optical path length of second pulsed light $L_2$ between the first reflection surface 11 and the second reflection surface 12 of the first reflection member 10D. The delay adjusting unit 70D moves the second reflection member 20D in a direction parallel to the first reflection surface 21, thereby to change an optical path length of first pulsed light $L_1$ between the first reflection surface 21 and the second reflection surface 22 of the second reflection member 20D. The delay adjusting unit 70D moves both or one of the first reflection member 10D and the second reflection member 20D, thereby to change a delay time τ between the first pulsed light $L_1$ and the second pulsed light $L_2$ incident on the nonlinear optical crystal 40.

The aperture 62 is provided between the second reflection member 20D and the nonlinear optical crystal 40, and is preferably provided between the second reflection member 20D and the focusing unit 30. The aperture 62 passes the first pulsed light $L_1$ reflected on the first reflection surface 11 of the first reflection member 10D and the second reflection surface 22 of the second reflection member 20D, and passes the second pulsed light $L_2$ reflected on the second reflection surface 12 of the first reflection member 10D and the first reflection surface 21 of the second reflection member 20D. On the other hand, the aperture 62 blocks pulsed light $L_3$ reflected on the first reflection surface 11 of the first reflection member 10D and the first reflection surface 21 of the second reflection member 20D, and blocks pulsed light $L_4$ reflected on the second reflection surface 12 of the first reflection member 10D and the second reflection surface 22 of the second reflection member 20D. That is, the aperture 62 prevents the pulsed light $L_3$ and the pulsed light $L_4$, which become noise at the time of correlation measurement, from entering the nonlinear optical crystal 40.

The autocorrelation measurement device 1D of the present embodiment emits the first pulsed light $L_1$ and the second pulsed light $L_2$ after the incident pulsed light $L_0$ is branched into two components to the same direction rather than emitting both the pulsed light components to different directions, and therefore, downsizing is easy.

(Fifth Embodiment)

Figure 6:
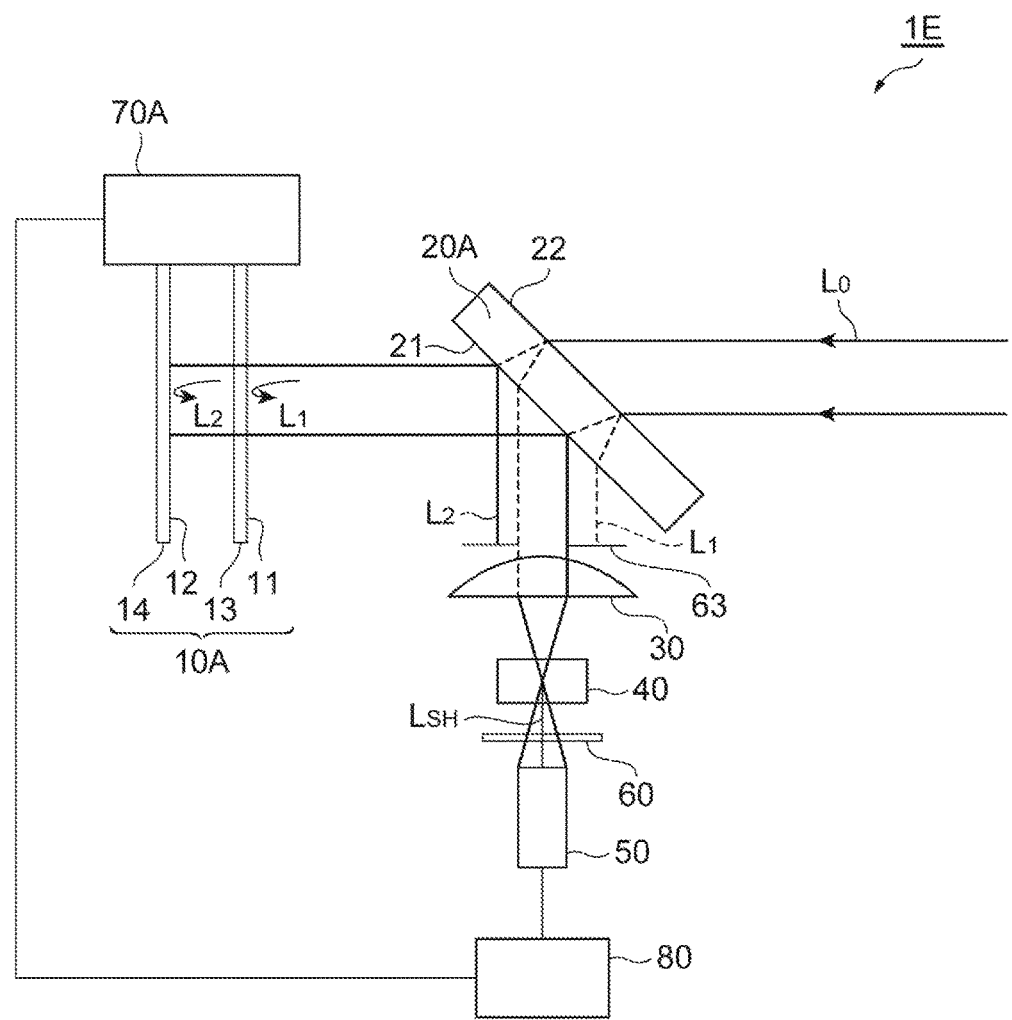
FIG. 6 is a diagram illustrating a configuration of an autocorrelation measurement device 1E according to a fifth embodiment.

FIG. 6 is a diagram illustrating a configuration of an autocorrelation measurement device 1E according to the fifth embodiment. The autocorrelation measurement device 1E includes a first reflection member 10A, a second reflection member 20A, a focusing unit 30, a nonlinear optical crystal 40, a detection unit 50, a filter 60, an aperture 63, a delay adjusting unit 70A, and an analysis unit 80.

The autocorrelation measurement device 1E of the fifth embodiment illustrated in FIG. 6 is different from the configuration of the autocorrelation measurement device 1A of the first embodiment illustrated in FIG. 1 in the size of a beam diameter of incident pulsed light $L_0$, in including the aperture 63 in place of the aperture 61, and in processing details in the analysis unit 80.

In the first to fourth embodiments, the beam diameter of the incident pulsed light $L_0$ is set to cause the beams of the first pulsed light $L_1$ and the second pulsed light $L_2$ emitted from the second reflection member not to spatially overlap with each other. On the other hand, in the fifth embodiment, the beam diameter of the incident pulsed light $L_0$ is set to cause beams of first pulsed light $L_1$ and second pulsed light $L_2$ emitted from the second reflection member to spatially overlap each other.

The aperture 63 is provided between the second reflection member 20A and the nonlinear optical crystal 40, and is preferably provided between the second reflection member 20A and the focusing unit 30. The aperture 63 selectively passes a part where the respective beams of the first pulsed light $L_1$ and the second pulsed light $L_2$ spatially overlap each other.

The nonlinear optical crystal 40 is disposed on a focusing position by the focusing unit 30, and generates second harmonic light $L_{SH}$ by incidence of the first pulsed light $L_1$ and the second pulsed light $L_2$. In the present embodiment, the second harmonic light $L_{SH}$ generated in the nonlinear optical crystal 40 includes not only second harmonic light due to a correlation between the first pulsed light $L_1$ and the second pulsed light $L_2$ but also second harmonic light due to only the first pulsed light $L_1$ and second harmonic light due to only the second pulsed light $L_2$. The detection unit 50 detects the intensity of these types of second harmonic light.

The analysis unit 80 changes a delay time τ by the delay adjusting unit 70A and acquires a detection result (intensity $I_{SH}(\tau)$ of the second harmonic light $L_{SH}$) by the detection unit 50 of when each delay time τ is set. Then, the analysis unit 80 obtains an SHG autocorrelation function $S_2(\tau)$ expressed by the following formula (4) on the basis of a relationship between the delay time τ and the second harmonic light intensity $I_{SH}(\tau)$ to obtain a pulse width of the incident pulsed light $L_0$. The third term on the right side of this formula is expressed by the following formula (5), and the fourth term on the right side is expressed by the following formula (6). $\omega_0$ is a center angular frequency of the incident pulsed light.

[Formula 4]

$$S_2(\tau)=1+2G_2(\tau)+4\mathrm{Re}[F_1(\tau)\exp(-i\omega_0\tau)]+\mathrm{Re}[F_2(\tau)\exp(-2i\omega_0\tau)] \quad (4)$$

[Formula 5]

$$F_1(\tau)=\tfrac{1}{2}\int_{-\infty}^{\infty}\{I(t)+I(t-\tau)\}E(t)E^*(t-\tau)dt \quad (5)$$

[Formula 6]

$$F_2(\tau)=\int_{-\infty}^{\infty}E^2(t)E^{*2}(t-\tau)dt \quad (6)$$

Figure 7:
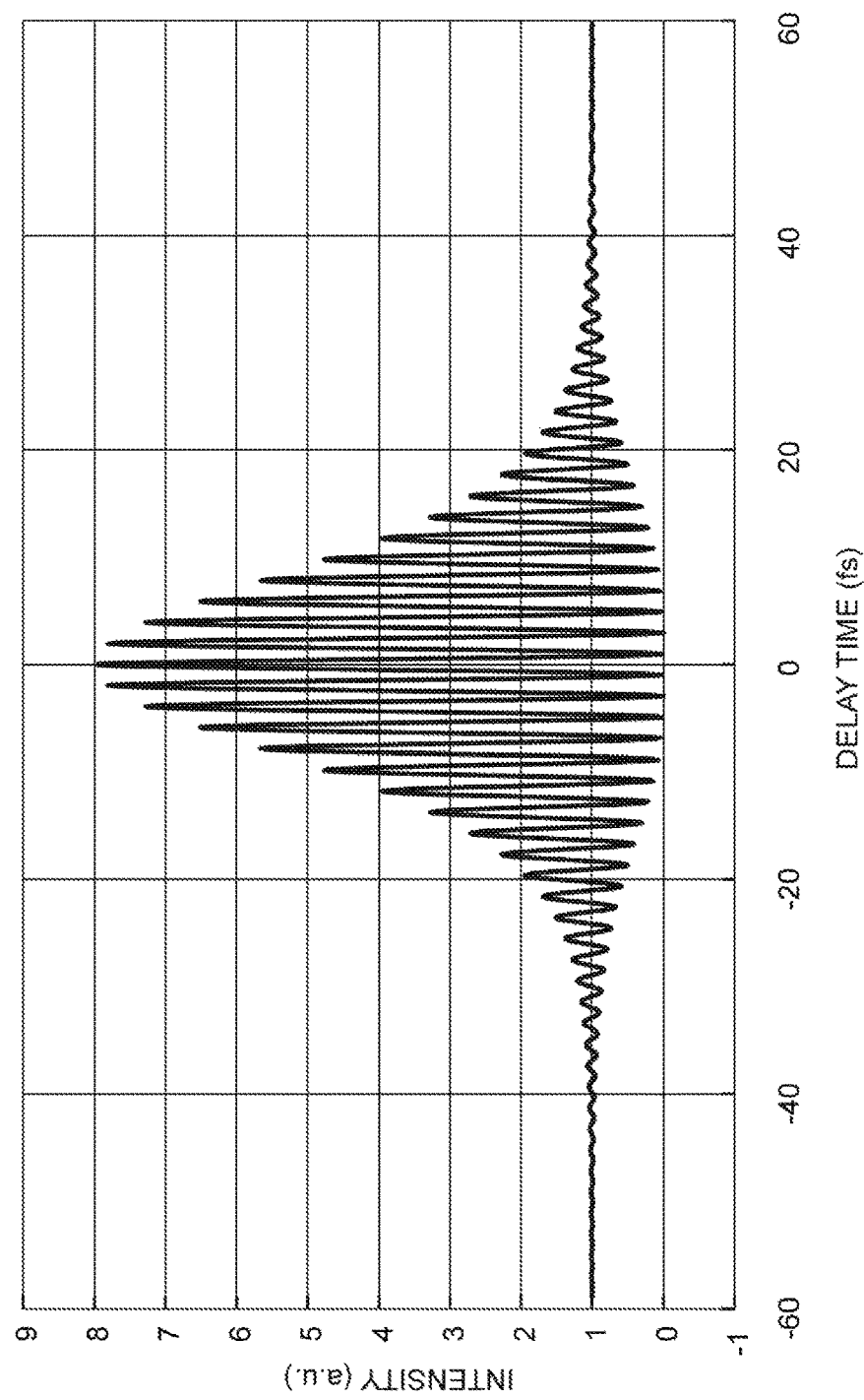
FIG. 7 is a diagram illustrating an example of a fringe-resolved SHG autocorrelation waveform obtained by a detection unit 50 of the autocorrelation measurement device 1E of the fifth embodiment.

FIG. 7 is a diagram illustrating an example of an SHG autocorrelation waveform obtained by the detection unit 50 of the autocorrelation measurement device 1E of the fifth embodiment. The horizontal axis represents the delay time τ set by the delay adjusting unit 70A and corresponds to an optical path length between the first reflection surface 11 and the second reflection surface 12 of the first reflection member 10A.

As illustrated in this figure, when the delay time τ is 0, a temporal overlap between the first pulsed light $L_1$ and the second pulsed light $L_2$ incident on the nonlinear optical crystal 40 becomes maximum, and thus a value of an envelope function of the SHG autocorrelation function becomes maximum. As an absolute value of the delay time τ becomes larger, the temporal overlap between the first pulsed light $L_1$ and the second pulsed light $L_2$ incident on the nonlinear optical crystal 40 becomes smaller, and thus the value of the envelope function becomes smaller. There is a specific relationship depending on a pulse waveform of the incident pulsed light $L_0$ between a full width at half maximum of the envelope function and a pulse width (full width at half maximum) of the incident pulsed light $L_0$. Therefore, the pulse width of the incident pulsed light $L_0$ can be obtained on the basis of the form of the envelope function. Note that such a technique is called fringe-resolved SHG autocorrelation method.

The autocorrelation measurement device 1E of the present embodiment emits the first pulsed light $L_1$ and the second pulsed light $L_2$ after the incident pulsed light $L_0$ is branched into two components to the same direction rather than emitting both the pulsed light components to different directions, and therefore, downsizing is easy.

(Sixth Embodiment)

Figure 8:
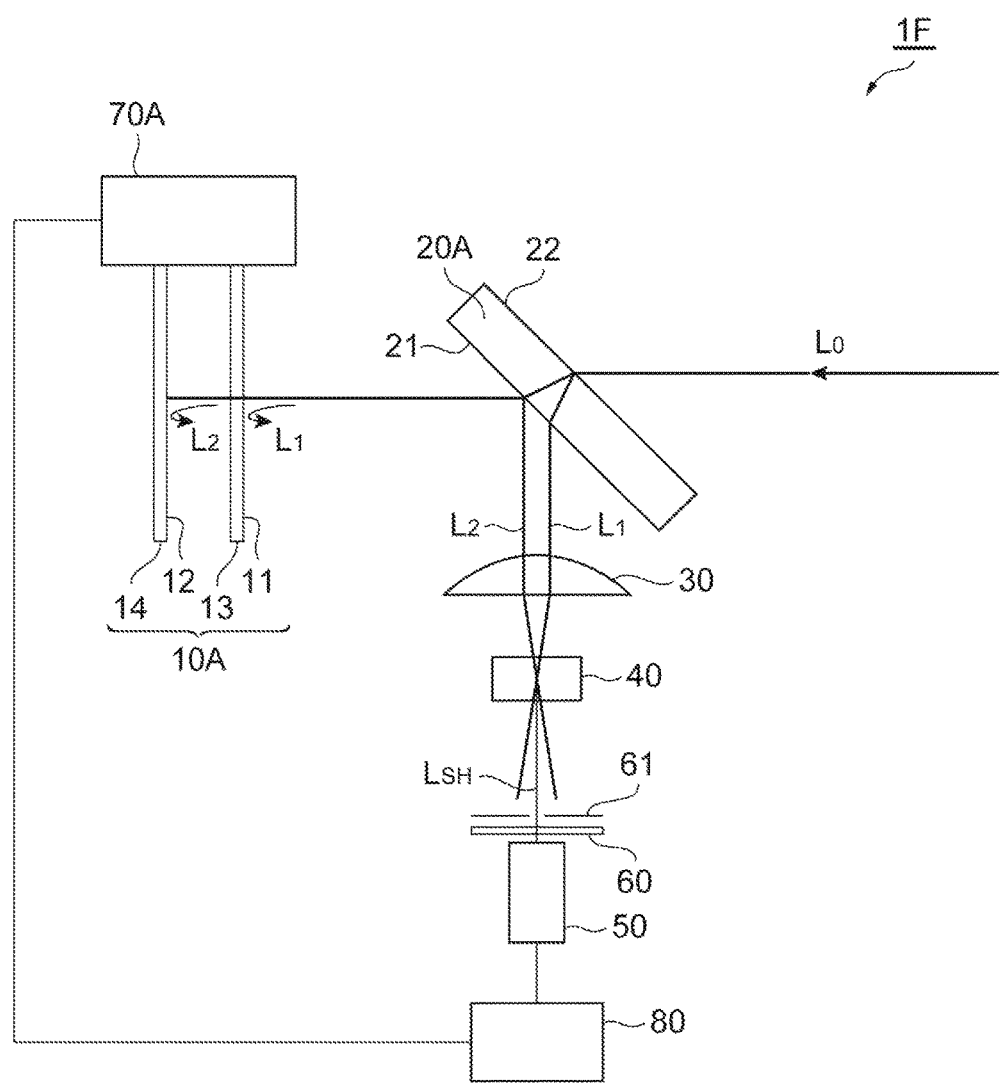
FIG. 8 is a diagram illustrating a configuration of an autocorrelation measurement device 1F according to a sixth embodiment.

FIG. 8 is a diagram illustrating a configuration of an autocorrelation measurement device 1F according to the sixth embodiment. The autocorrelation measurement device 1F of the sixth embodiment illustrated in FIG. 8 is different from the configuration of the autocorrelation measurement device 1A of the first embodiment illustrated in FIG. 1 in using a spectrometer as the detection unit 50 and in processing details in the analysis unit 80.

In the present embodiment, the detection unit 50 detects a spectrum of second harmonic light $L_{SH}$ due to a correlation between first pulsed light $L_1$ and second pulsed light $L_2$. The analysis unit 80 changes a delay time τ by the delay adjusting unit 70A and acquires a detection result (spectrum of the second harmonic light $L_{SH}$) by the detection unit 50 of when each delay time τ is set. Then, the analysis unit 80 obtains information of both amplitude distribution and phase distribution of the incident pulsed light $L_0$ on the basis of a relationship between the delay time τ and the spectrum of the second harmonic light. Note that such a technique is called frequency-resolved optical gating.

(Other Embodiments)

The present invention is not limited to the above-described embodiments, and various modifications can be made. For example, in the fifth and sixth embodiments, as a method of changing the delay time τ between the first pulsed light $L_1$ and the second pulsed light $L_2$ incident on the nonlinear optical crystal 40, the method described in the second to fourth embodiments can be employed.

The autocorrelation measurement device according to the above embodiment is configured to include (1) a first reflection member having a first reflection surface for reflecting a part of incident pulsed light and a second reflection surface for reflecting light transmitted through the first reflection surface in the incident pulsed light, (2) a second reflection member having a first reflection surface for reflecting a part of light emitted from the first reflection member and a second reflection surface for reflecting light transmitted through the first reflection surface in the light, (3) a focusing unit for focusing first pulsed light reflected by the first reflection surface of the first reflection member and the second reflection surface of the second reflection member and second pulsed light reflected by the second reflection surface of the first reflection member and the first reflection surface of the second reflection member, (4) a nonlinear optical crystal disposed on a focusing position by the focusing unit and for generating second harmonic light by incidence of the first pulsed light and the second pulsed light, (5) a detection unit for detecting the second harmonic light, (6) a delay adjusting unit for changing a delay time between the first pulsed light and the second pulsed light entering the nonlinear optical crystal, and (7) an analysis unit for obtaining a pulse width of the incident pulsed light on the basis of a relationship between the delay time set by the delay adjusting unit and a detection result by the detection unit.

The above device may have a configuration in which a dielectric multilayer film for adjusting an intensity ratio between the first pulsed light and the second pulsed light is applied to any one of the surfaces of both the first reflection member and the second reflection member, the surfaces transmitting or reflecting light.

The above device may have a configuration in which the first reflection member includes a first flat plate having the first reflection surface and a second flat plate disposed in parallel to the first flat plate and having the second reflection surface, and the delay adjusting unit changes a distance between the first flat plate and the second flat plate to change the delay time.

Further, the above device may have a configuration in which the first reflection member includes a refractive index variable member provided between the first reflection surface and the second reflection surface and having a refractive index changed according to an applied voltage value, and the delay adjusting unit changes a voltage value to be applied to the refractive index variable member to change the delay time.

The above device may have a configuration in which the first pulsed light and the second pulsed light incident on the nonlinear optical crystal are non-coaxial with each other, an aperture for selectively passing the second harmonic light due to a correlation between the first pulsed light and the second pulsed light in light emitted from the nonlinear optical crystal to the detection unit is provided between the nonlinear optical crystal and the detection unit, and the detection unit detects an intensity of the second harmonic light. In this case, the pulse width of the incident pulsed light can be obtained by a non-collinear SHG autocorrelation method.

The above device may have a configuration in which an aperture for selectively passing a part where respective beams of the first pulsed light and the second pulsed light spatially overlap each other is provided between the second reflection member and the nonlinear optical crystal, and the detection unit detects an intensity of the second harmonic light. In this case, the pulse width of the incident pulsed light can be obtained by a fringe-resolved SHG autocorrelation method.

The above device may have a configuration in which the first pulsed light and the second pulsed light incident on the nonlinear optical crystal are non-coaxial with each other, an aperture for selectively passing the second harmonic light due to a correlation between the first pulsed light and the second pulsed light in light emitted from the nonlinear optical crystal to the detection unit is provided between the nonlinear optical crystal and the detection unit, and the detection unit detects a spectrum of the second harmonic light. In this case, information of both amplitude distribution and phase distribution of the incident pulsed light can be obtained by a frequency-resolved optical gating.

INDUSTRIAL APPLICABILITY

The present invention can be used as an autocorrelation measurement device that can be downsized.

REFERENCE SIGNS LIST 1A-1F—autocorrelation measurement device, 10A, 10B, 10D—first reflection member, 11—first reflection surface, 12—second reflection surface, 13—first flat plate, 14—second flat plate, 15—refractive index variable member, 20A, 20D—second reflection member, 21—first reflection surface, 22—second reflection surface, 30—focusing unit, 40—nonlinear optical crystal, 50—detection unit, 60—filter, 61-63—aperture, 70A-70D—delay adjusting unit, 71—first rotation stage, 72—second rotation stage, 80—analysis unit, $L_0$—incident pulsed light, $L_1$—first pulsed light, $L_2$—second pulsed light, $L_{SH}$—second harmonic light.

The invention claimed is:

1. An autocorrelation measurement device comprising:
a first reflection member having a first reflection surface for reflecting a part of incident pulsed light and a second reflection surface for reflecting light transmitted through the first reflection surface in the incident pulsed light;
a second reflection member having a first reflection surface for reflecting a part of reflected pulsed light reflected on the first reflection surface or the second reflection surface of the first reflection member and a second reflection surface for reflecting light transmitted through the first reflection surface in the reflected pulsed light;
a focusing unit configured to focus first pulsed light reflected on the first reflection surface of the first reflection member and the second reflection surface of the second reflection member and second pulsed light reflected on the second reflection surface of the first reflection member and the first reflection surface of the second reflection member;
a nonlinear optical crystal disposed on a focusing position by the focusing unit and configured to generate second harmonic light by incidence of the first pulsed light and the second pulsed light;
a detection unit configured to detect the second harmonic light;
a delay adjusting unit configured to change a delay time between the first pulsed light and the second pulsed light incident on the nonlinear optical crystal; and
an analysis unit configured to obtain a pulse width of the incident pulsed light on the basis of a relationship between the delay time set by the delay adjusting unit and a detection result by the detection unit.

2. The autocorrelation measurement device according to claim 1, wherein a dielectric multilayer film configured to adjust an intensity ratio between the first pulsed light and the second pulsed light is applied to any one of the surfaces of both the first reflection member and the second reflection member, the surfaces transmitting or reflecting light.

3. The autocorrelation measurement device according to claim 1, wherein the first reflection member includes a first flat plate having the first reflection surface and a second flat plate disposed in parallel to the first flat plate and having the second reflection surface, and
the delay adjusting unit changes a distance between the first flat plate and the second flat plate to change the delay time.

4. The autocorrelation measurement device according to claim 1, wherein the first reflection member includes a refractive index variable member provided between the first reflection surface and the second reflection surface and having a refractive index changed according to an applied voltage value, and
the delay adjusting unit changes a voltage value to be applied to the refractive index variable member to change the delay time.

5. The autocorrelation measurement device according to claim 1, wherein the first pulsed light and the second pulsed light incident on the nonlinear optical crystal are non-coaxial with each other,
an aperture configured to selectively pass the second harmonic light due to a correlation between the first pulsed light and the second pulsed light in light emitted from the nonlinear optical crystal to the detection unit is provided between the nonlinear optical crystal and the detection unit, and
the detection unit detects an intensity of the second harmonic light.

6. The autocorrelation measurement device according to claim 1, wherein an aperture configured to selectively pass a part where respective beams of the first pulsed light and the second pulsed light spatially overlap each other is provided between the second reflection member and the nonlinear optical crystal, and
the detection unit detects an intensity of the second harmonic light.

7. The autocorrelation measurement device according to claim 1, wherein the first pulsed light and the second pulsed light incident on the nonlinear optical crystal are non-coaxial with each other, an aperture configured to selectively pass the second harmonic light due to a correlation between the first pulsed light and the second pulsed light in light emitted from the nonlinear optical crystal to the detection unit is provided between the nonlinear optical crystal and the detection unit, and the detection unit detects a spectrum of the second harmonic light.

* * * * *